No. 776,552. PATENTED DEC. 6, 1904.
H. ROMÜNDER.
PASSENGER CAR.
APPLICATION FILED MAR. 1, 1904.
NO MODEL. 2 SHEETS—SHEET 1.
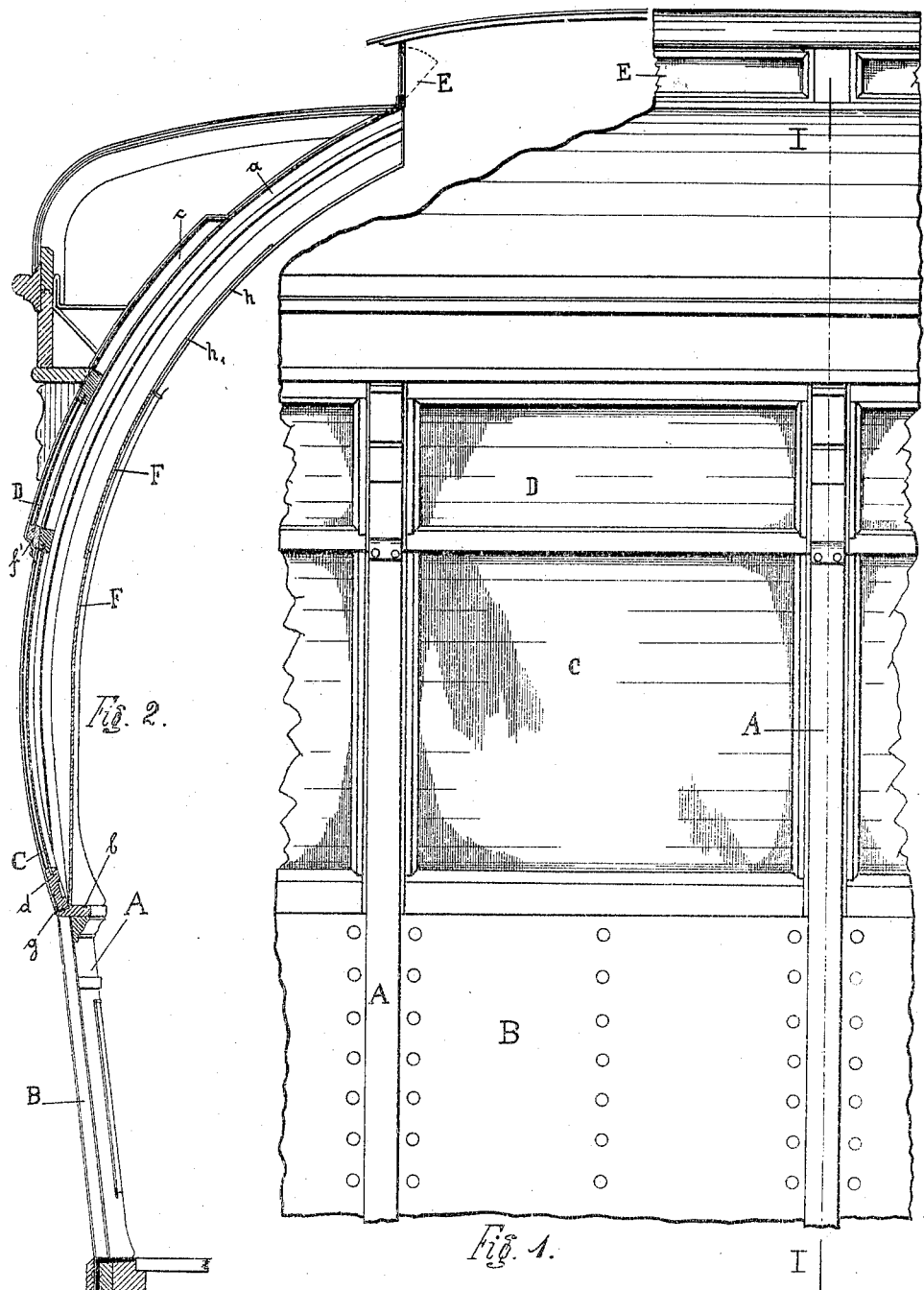

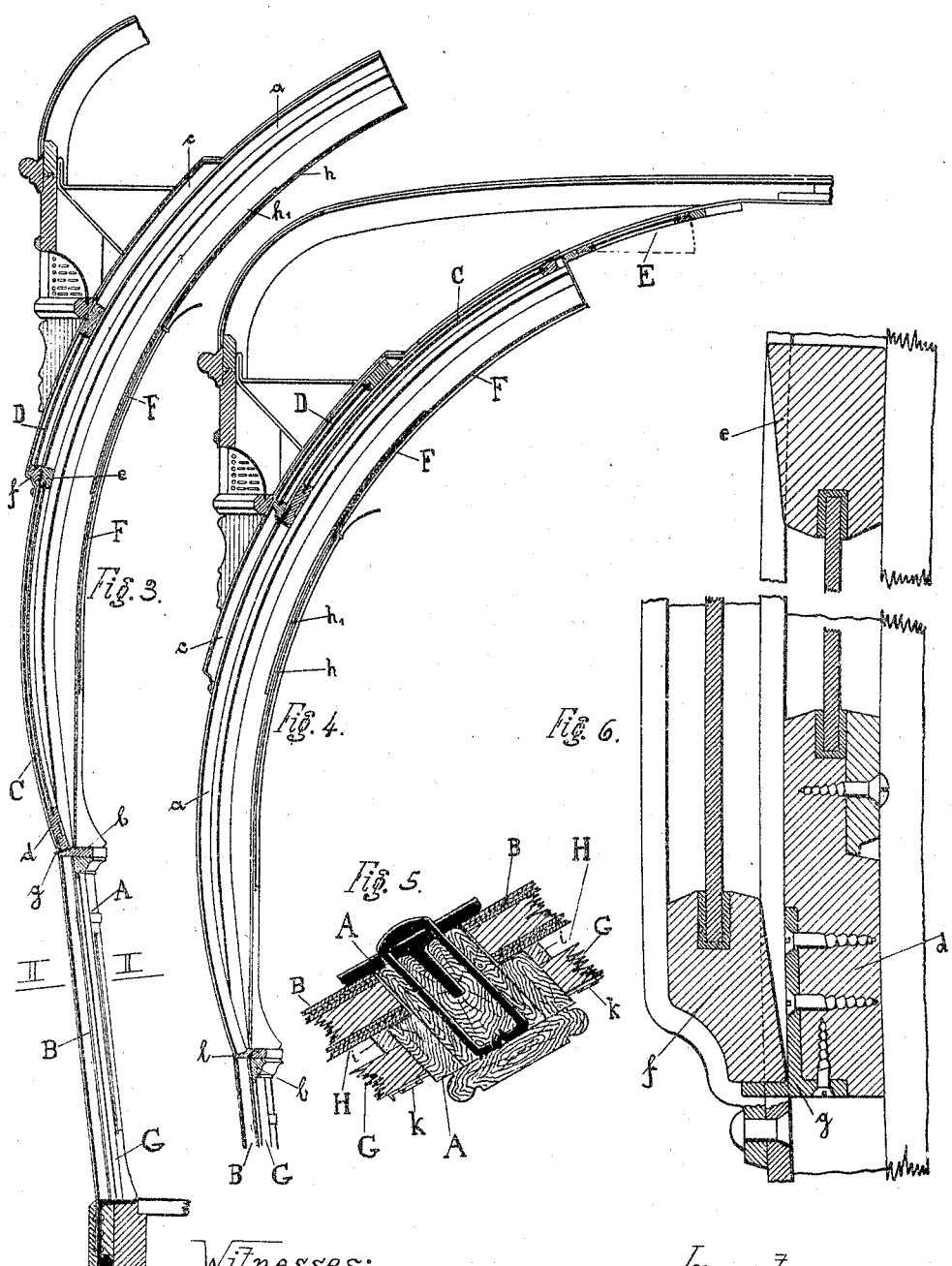

No. 776,552. Patented December 6, 1904.

UNITED STATES PATENT OFFICE.

HERMANN ROMÜNDER, OF MILWAUKEE, WISCONSIN.

PASSENGER-CAR.

SPECIFICATION forming part of Letters Patent No. 776,552, dated December 6, 1904.

Application filed March 1, 1904. Serial No. 196,019. (No model.)

*To all whom it may concern:*

Be it known that I, HERMANN ROMÜNDER, a citizen of the United States, and a resident of Milwaukee, in the county of Milwaukee, State of Wisconsin, have invented certain new and useful Improvements in Passenger-Cars, of which the following is a specification.

The object of my invention is to provide a passenger-car of improved construction, whether convertible or closed, with or without monitor-roof, and whether operated by electricity, cable, steam, or other power at greatly reduced manufacturing cost, combining great strength and durability with comfort and attractiveness, each of the side sections of the passenger-car being arranged with a two-part curved side window, an upper and a lower one, the upper one of which may readily and easily be raised into the roof portion of the car simultaneously with the lower one in case the entire side window area is to be opened, while otherwise the lower window alone when raised will usually be amply sufficient to produce an abundance of fresh air and ventilation in pleasant weather, a one or two piece flexible wood-veneer screen or shade in place of the expensive flopping cloth side curtains now generally used, and an additional removable panel suitably secured to the side posts of the car at their lower portion in order to prevent drafts and produce an absolutely-closed weather-tight lower portion of the side sections on both sides of the car.

My invention therefore consists in a passenger-car the body of which comprises a suitable skeleton frame composed of a bottom or under frame and a roof-frame and a number of side posts secured thereto, which latter are provided with suitable grooves adapted to receive the two-part sliding side windows and the flexible screens or shades; also, if the car is of the convertible type, the flexible sliding side panels, said car also having removable panels provided between the side posts at their lower portion, so arranged as to be used during the cold season and to be removed during the warm season and when in position to form, with the side panels of the car, one or more air-spaces.

One form of my invention is shown in the accompanying drawings, in which—

Figure 1 shows one complete side section consisting of a side panel and an upper and a lower side window in a car with monitor-roof. Fig. 2 shows a vertical section on line 1 1 of Fig. 1. Fig. 3 shows a vertical section through part of a car without monitor-roof, both windows being in their lowered position. Fig. 4 shows a vertical section through part of a car without monitor-roof, both windows being in their extreme raised position stored in the roof portion of the car. Fig. 5 shows, on an enlarged scale, a horizontal section on line 2 2 of Fig. 3. Fig. 6 shows a detail in sectional view of the two-part side window construction.

Same letters indicate similar parts in the different figures.

A A are the side posts, consisting of metal, wood, or other suitable material and construction, preferably straight and substantially vertical in their lower portion and curved on the arc of a circle in their upper portion.

B is the side panel of suitable material and construction, which for convertible car-bodies may be arranged as a flexible sliding panel movable in suitable panel-grooves provided in the side posts A A, said panel-grooves extending almost the entire length of the side posts from the floor to the ceiling of the car, being straight in the lower straight part of the side posts and circular in the upper curved part of the side posts.

C is the large lower side window, and D is the smaller upper side window, each in a rigid curved window-sash movable in separate preferably concentric grooves, an inner groove $a$ for window C and an outer groove $c$ for window D provided in the upper curved portion of the said side posts, the groove $a$ for the lower window C extending almost the entire length of the curved portion of the side posts substantially from the level of the window sill or stool $b$ of the panel to a point near the ventilators E, arranged in the ceiling to admit air into the interior of the car, and the outer groove $c$ for the upper window D extending substantially from the level of the top rail of the lower window C in its closed position a suitable distance into the roof portion to allow window D to be raised all the way up and stored in said roof portion.

One side panel B and one lower and one upper side window C and D constitute one of the side sections of the car, the side posts A A separating the successive side sections, the side panels and windows substantially filling the space between the roof portion and the floor of the car on both sides when closed.

In their lowered position when the side section is closed the lower sash-rail $d$ of the lower window C rests slantingly against the window-stool $b$ of the side panel B, fitting weather-tight in the recess $l$ of the said window-stool $b$, and the upper sash-rail $e$ of the window C and the lower sash-rail $f$ of the upper window D are so arranged with correspondingly-slanting meeting faces as to form check-rails to produce a tight joint when both side windows are closed, as is more clearly shown in Fig. 6.

One or more suitable catches or fingers $g$, preferably T-shaped and consisting of metal or other suitable material, are secured to the lower sash-rail $d$ by means of screws or otherwise and so arranged as to take hold of the lower sash-rail $f$ of the upper window D when the lower window C is raised a sufficient distance so that its lower rail $d$ is at the level of the said sash-rail $f$, whereby both windows may then be raised up together into the roof portion of the car in case the entire side window area is to be opened, and when the side windows are to be lowered the window D and the window C slide simultaneously in their respective grooves until window D reaches its normal closed position, and then the lower window C slides separately part or all the way down in its groove $a$, the upper window D while being raised and lowered and in its raised position resting on and being supported by the said catches or fingers $g$ $g$, secured to said lower sash-rail $d$. For most purposes, however, it is entirely sufficient to raise only the lower window C, so that the upper window D usually remains in its closed position, and it is not necessary to raise the upper window D unless the entire side window-space is to be opened, and in my construction the weight of said window D does not come into play until the lower window C is raised such a distance into the roof portion that its lower rail $d$, with the catches or fingers $g$ secured thereto, touches the lower rail $f$ of the upper window D, the upper and lower window of each side section being raised and lowered simultaneously as long as the lower sash of the upper window rests on said fingers or catches $g$ and the lower window C sliding separately in its groove while the said catches or fingers are released of the weight of the upper window.

F F are flexible sliding window screens or shades movable in the grooves $h$ $h'$, provided for same in the upper curved portion of the side posts. I arrange these screens or shades preferably in two pieces for each side section, a large lower plate and a smaller upper plate, as the lower plate is of sufficient size longitudinally for most purposes, and the smaller upper plate is called into service and raised or lowered only when the entire window area is to be opened or covered for protection against the rays of the sun or for other purposes, and the means for raising both pieces of said screens or shades may be the same as those employed for the two-part side windows, or other means may be used. These flexible sliding screens or shades F F may be made of any suitable material, such as metal or cloth or other similar fabrics; but they are preferably constructed of waterproof wood-veneer plates, each plate consisting of two or more ply wood veneer laid with reversed grain and glued together with any suitable waterproof cementing composition—such, for example, as a compound of glue and potash—whereby the veneer layers form practically one homogeneous plate of wood impervious to moisture and atmospheric influences. These flexible screens or shades F F may be provided with a number of small perforations, which will admit of air circulation without allowing the rays of the sun or other influences to penetrate.

In order to prevent drafts and produce an absolutely-closed air and weather tight lower portion of the side sections on both sides of the car, I provide additional removable panels G G between the side posts at their lower straight portion, resting at the top against the window-stool $b$, at the bottom against the floor of the car, and at the sides against suitable stops $i$ $i$ of the side posts, said panels G G, consisting of wood or other suitable material, being fastened by suitable catches $k$ $k$ or other means to the side posts and so arranged as to be used during the cold season and be removed during the warm season and when in position to form one or more air-spaces H H with the side panels B B.

I claim—

1. The above-described passenger-car, the body of which comprises a suitable skeleton frame, composed of a bottom frame, a roof-frame and a number of side posts secured thereto, the said side posts consisting of metal, wood or other suitable material and construction, preferably straight and substantially vertical in the lower portion and curved on the arc of a circle in the upper portion, and being provided with suitable grooves adapted to receive the two-part curved sliding side windows and the flexible window screens or shades; each of the said two-part side windows consisting of a large lower and a smaller upper window, in sashes of suitable material and construction, said upper and lower window-sashes being movable in separate, preferably concentric sash-grooves, the upper rail of the lower window-sash and the lower rail of the upper window-sash being arranged with correspondingly-slanting meeting faces so as to form check-rails, producing a tight joint when both windows are closed, substantially as shown and described.

2. The above-described passenger-car, the body of which comprises a suitable skeleton frame, composed of a bottom frame, a roof-frame and a number of side posts, the said side posts, of suitable material and construction, being preferably straight and substantially vertical in their lower portion and curved on the arc of a circle in their upper portion, and separating the successive side sections of the car; each side section consisting of a side panel and a lower and an upper curved side window, the said side panels and side windows substantially filling the space between the roof portion and the floor of the car, when closed; the lower and the upper window of each side section sliding in separate concentric grooves provided in the upper curved portion of the side posts; the lower rail of the lower side window, when closed, resting slantingly against the window-stool of the side panel, and fitting weather-tight in the recess of the said window-stool; suitable catches or fingers, preferably T-shaped and consisting of metal or other suitable material, being secured to the lower sash-rail of the lower side window by means of screws or otherwise, and so arranged as to take hold of the lower sash-rail of the upper side window when the lower side window is raised a sufficient distance so that its lower rail is at the level of the lower rail of the upper window, whereby both side windows may then be raised up together into the roof portion of the car; flexible sliding window screens or shades, consisting of waterproof wood-veneer plates or other suitable material, movable in grooves provided for them in the upper curved portion of the side posts; and removable panels, consisting of wood or other suitable material, provided between the lower straight portion of the side posts and suitably fastened thereto, so arranged as to be removed during the warm season, and when in position, to form one or more air-spaces between the side panels and the removable panels, substantially as shown and described.

3. The above-described passenger-car, composed of a roof-frame, a bottom frame and a number of side posts, suitably connected to form a skeleton frame; a number of side sections, separated by said side posts which are straight and substantially vertical in their lower portion and curved on the arc of a circle in their upper portion; one lower and one upper curved side window, each in a rigid curved window-sash, and one side panel constituting one of said side sections, the said side windows and panels substantially filling the space between the roof and the floor of the car on both sides, when closed; the said window-sashes sliding in separate concentric grooves provided in the upper curved portion of the said side posts, the lower sash-rail of the lower side window, when closed, resting against the window-stool of the side panel, fitting weather-tight in the recess of the said window-stool, and having one or more suitable T-shaped catches or fingers, consisting of metal or other suitable material, secured thereto, on which said catches or fingers the upper window rests while being raised and lowered and in its raised position; the meeting faces of the upper sash-rail of the lower window and the lower sash-rail of the upper window being so arranged as to form check-rails, to produce a tight joint when both windows are closed; flexible sliding window screens or shades, of wood-veneer plates or other suitable material, a large lower plate and a smaller upper plate for each side section, preferably provided with small perforations, movable in grooves provided for them in the upper curved portion of the said side posts; and removable panels, consisting of wood or other suitable material, provided between the said side posts at their lower straight portion and suitably secured thereto, closing the lower portion of the side sections of the car air and weather tight and so arranged as to form one or more air-spaces between the said side panels and the said removable panels, substantially as shown and described.

4. In a passenger-car a number of side sections, substantially occupying when closed, the space between the roof and the floor of the car on both sides, the successive side sections being separated by side posts, consisting of metal or other suitable material and construction, with a straight and substantially vertical lower portion and a curved upper portion; each side section consisting of a side panel with a window-sill at its upper part, and a large lower and a small upper curved side window, each in a rigid curved window-sash, movable in separate concentric sash-grooves provided in the upper curved portion of the said side posts; the sash-groove for the lower window extending almost the entire length of the curved portion of the side posts, substantially from the window-sill level on to a point near the ventilators arranged in the ceiling of the car, and the groove for the upper window extending substantially from the level of the top rail of the lower window, in its closed position, a suitable distance into the roof portion to allow the upper window to be raised all the way up and stored in said roof portion; flexible window screens or shades, of suitable material, movable in grooves provided in the upper curved portion of the said side posts; and removable panels consisting of wood or other suitable material, provided between adjoining side posts at their lower portion and forming air-spaces with the side panels, tightly closing the lower portion of the side sections on both sides of the car, substantially as shown and described.

5. In a convertible passenger-car a number of side sections, substantially occupying when closed, the space between the roof and the floor of the car on both sides, the successive side sections being separated by side posts, consisting of metal or other suitable material and construction, with a straight and substantially vertical lower portion and a curved upper portion; each side section consisting of a lower flexible panel, movable in panel-grooves provided in the side posts, which panel-grooves extend almost the entire length of the side posts from the floor to the ceiling of the car, being straight in the lower straight part of the side posts and circular in the upper curved part of the side posts; a window-sill secured to the upper part of the flexible panel, and a two-part curved side window, a large lower and a small upper window, each in a rigid curved window-sash, movable in separate concentric sash-grooves provided in the upper curved part of the side posts; flexible sliding window screens or shades, of suitable material, movable in grooves provided in the upper curved part of the side posts; and removable panels consisting of wood or other suitable material, provided between the side posts at their lower portion and forming air-spaces with the flexible side panels, so arranged as to be removed during the warm season, and, when in position, closing the lower portion of the side sections on both sides of the car perfectly air and weather tight, substantially as shown and described.

6. In a passenger-car a number of side sections separated by side posts, the lower portion of which is straight and the upper portion curved on the arc of a circle; each side section consisting of a side panel with a window-stool at its upper part, and a two-part curved sliding side window, a large lower window and a small upper window, each in a rigid curved window-sash; movable in separate concentric grooves provided in the upper curved portion of the side posts; an inner longer groove for the large window, extending substantially from the level of the window-stool to a point near the ventilators arranged in the ceiling of the car, almost the entire length of the curved portion of the side posts, and an outer groove for the smaller window, extending substantially from the level of the top rail of the large window in its closed position, a suitable distance into the roof portion to allow the small window sliding in said groove, to be raised all the way up and stored in said roof portion; the lower sash-rail of the lower window resting slantingly against the window-stool, fitting weather-tight into a recess of the said window-stool; the top rail of the lower window-sash and the bottom rail of the upper window-sash being arranged with correspondingly-slanted meeting faces so as to form check-rails, producing a tight joint when both windows are closed; suitable catches or fingers, preferably T-shaped and consisting of metal or other suitable material, being secured to the bottom rail of the lower window-sash by means of screws or otherwise, and so arranged as to support the smaller upper window while being raised and lowered and in its raised position, the said upper window resting with its bottom sash-rail on the said catches or fingers; the upper and lower windows being raised and lowered simultaneously as long as the bottom rail of the upper window rests on the said fingers or catches, the lower window sliding separately in its groove while the said catches or fingers are released of the weight of the upper window, substantially as shown and described.

7. In a passenger-car flexible sliding window screens or shades, movable in grooves provided for same in the upper portion of the side posts, preferably arranged in two pieces for each side window, and constructed of waterproof wood-veneer plates, each plate consisting of two or more ply wood veneer, laid with reversed grain and glued together with a waterproof cementing composition, whereby the veneer layers form practically one homogeneous plate of wood, impervious to moisture and atmospheric influences; and suitable means whereby the said window screens or shades may be raised or lowered, substantially as shown and described.

8. In a passenger-car a number of removable panels, consisting of wood or other suitable material, provided between the side posts of the car at their lower portion, and resting at the top against the window-stool of the side panel, at the bottom against the floor of the car, and at the sides against stops secured to the side posts, the said removable panels being fastened to the side posts by suitable catches or other means, and so arranged as to be used during the cold season and removed during the warm season, forming, when in position, one or more air-spaces with the side panels, and producing an absolutely-closed weather-tight lower portion of the side sections on both sides of the car, substantially as shown and described.

Signed in Milwaukee, county of Milwaukee, State of Wisconsin, this 24th day of February, 1904.

HERMANN ROMÜNDER.

Witnesses:
CARL S. FIEDLER,
PAULA ROSEMARK.